(12) United States Patent
Gimpel et al.

(10) Patent No.: US 11,624,824 B2
(45) Date of Patent: Apr. 11, 2023

(54) OPTOELECTRONIC SENSOR AND METHOD FOR DETECTING OBJECTS

(71) Applicant: SICK AG, Waldkirch (DE)

(72) Inventors: Hartmut Gimpel, Waldkirch (DE); Gottfried Hug, Waldkirch (DE); Klaus Clemens, Waldkirch (DE)

(73) Assignee: SICK AG, Waldkirch (DE)

( * ) Notice: Subject to any disclaimer, the term of this patent is extended or adjusted under 35 U.S.C. 154(b) by 1080 days.

(21) Appl. No.: 16/257,697

(22) Filed: Jan. 25, 2019

(65) Prior Publication Data

US 2019/0235082 A1 Aug. 1, 2019

(30) Foreign Application Priority Data

Jan. 26, 2018 (DE) .......................... 102018101847.9

(51) Int. Cl.
*G01S 17/42* (2006.01)
*G01S 7/481* (2006.01)
*G01S 17/931* (2020.01)

(52) U.S. Cl.
CPC ............. *G01S 17/42* (2013.01); *G01S 7/4811* (2013.01); *G01S 7/4813* (2013.01); *G01S 7/4815* (2013.01); *G01S 7/4817* (2013.01); *G01S 7/4812* (2013.01); *G01S 17/931* (2020.01)

(58) Field of Classification Search
CPC .... G01S 7/4811; G01S 7/4812; G01S 7/4813; G01S 7/4815; G01S 7/4817; G01S 7/484; G01S 7/486; G01S 17/42; G01S 17/931
See application file for complete search history.

(56) References Cited

U.S. PATENT DOCUMENTS 8,767,190 B2 7/2014 Hall
2010/0020306 A1 1/2010 Hall
(Continued)

FOREIGN PATENT DOCUMENTS

DE 197 57 849 B4 12/2004
DE 10 2004 014 041 A1 10/2005
(Continued)

OTHER PUBLICATIONS

Office Action dated Sep. 28, 2018 issued in corresponding German Application No. 10 2018 101 847.9.

*Primary Examiner* — Yuqing Xiao
*Assistant Examiner* — Benjamin Richard Hebert
(74) *Attorney, Agent, or Firm* — Nath, Goldberg & Meyer; Jerald L. Meyer

(57) ABSTRACT

An optoelectronic sensor (10) for detecting objects in a monitoring region (20), the sensor (10) having a scanning unit (12, 58) movable about an axis of rotation (18), a plurality of scanning modules (22) for periodically scanning the monitoring region (20) and for generating corresponding received signals, and an evaluation unit (48) for obtaining information about the objects from the received signals, the scanning modules (22) comprising at least one light transmitter (24) for transmitting several light beams (28) separated from one another and at least one light receiver (36) for generating the received signals from the light beams (32) remitted by the objects, wherein at least one scanning module (22) is at least one of tilted by a tilt angle (β) relative to its main viewing direction and rotated by a rotation angle (γ).

23 Claims, 7 Drawing Sheets

(56) References Cited

U.S. PATENT DOCUMENTS

Figure 1:
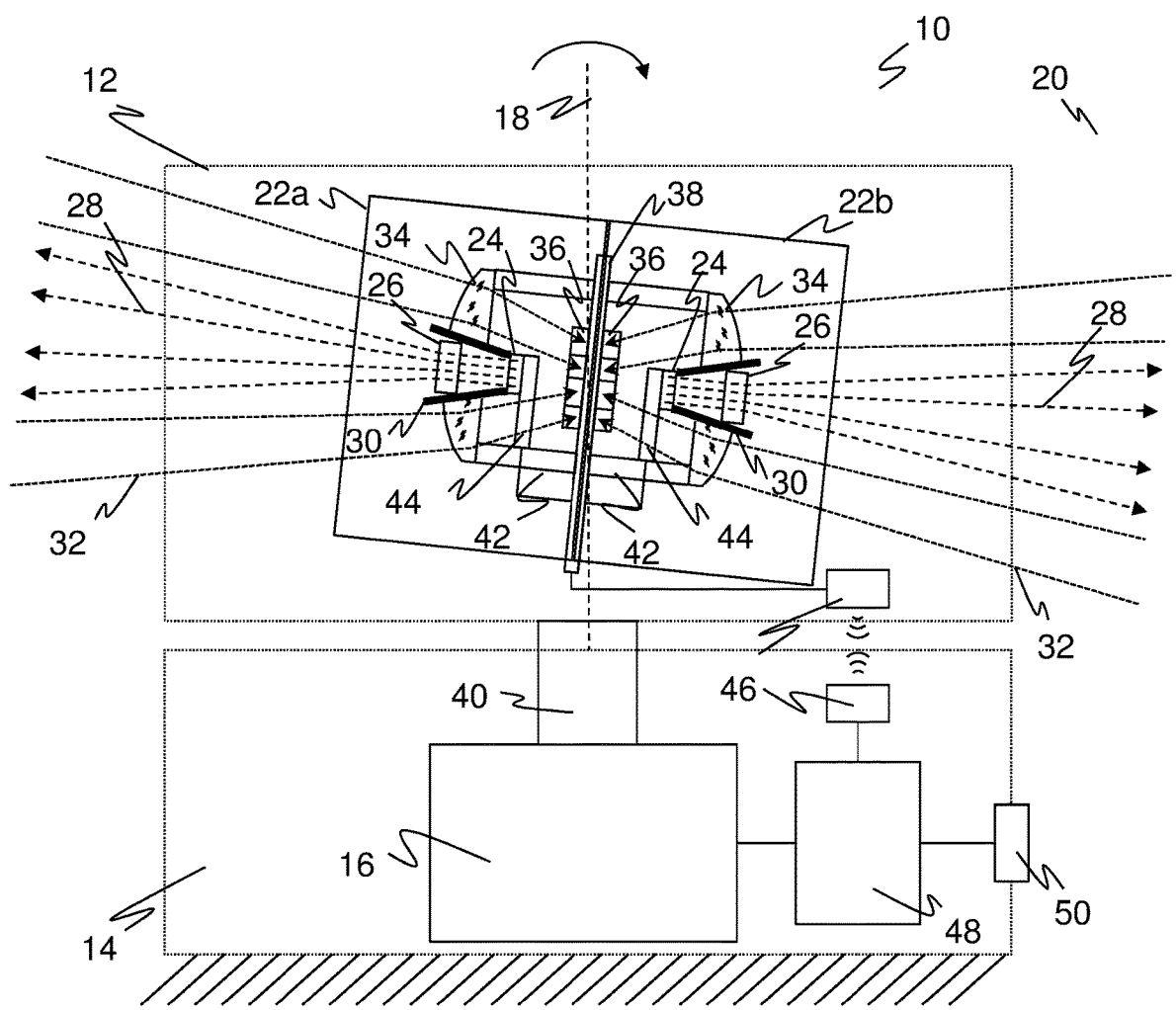

| | | | |
|---|---|---|---|
| 2011/0216304 A1* | 9/2011 | Hall | G01S 17/89 |
| | | | 356/4.01 |
| 2014/0111812 A1* | 4/2014 | Baeg | G01S 17/87 |
| | | | 356/610 |
| 2016/0266242 A1 | 9/2016 | Gilliland et al. | |
| 2016/0291136 A1* | 10/2016 | Lindskog | G01S 7/4813 |
| 2017/0115497 A1* | 4/2017 | Chen | H04N 13/207 |
| 2018/0143301 A1* | 5/2018 | Badoni | G01S 7/484 |
| 2018/0301875 A1* | 10/2018 | Burroughs | H01S 5/0262 |
| 2018/0364334 A1* | 12/2018 | Xiang | G01S 17/931 |
| 2019/0187711 A1* | 6/2019 | Xie | G05D 1/106 |

FOREIGN PATENT DOCUMENTS

| | | | | |
|---|---|---|---|---|
| EP | 2 863 176 A2 | 4/2015 | | |
| WO | 2008/008970 A2 | 1/2008 | | |
| WO | 2016/160961 A1 | 10/2016 | | |
| WO | WO-2017119537 A1 * | 7/2017 | | B64C 27/04 |
| WO | 2019136854 A1 | 7/2019 | | |

* cited by examiner

OPTOELECTRONIC SENSOR AND METHOD FOR DETECTING OBJECTS

The invention relates to an optoelectronic sensor and a method for detecting objects in a monitoring region.

Many optoelectronic sensors operate according to the scanning principle, in which a light beam is transmitted into the monitoring region, and the light beam reflected by objects is received in order to electronically evaluate the received signal. The light time of flight often is measured with a known phase method or pulse method for determining the distance of a scanned object.

For extending the measuring range of a single-beam light sensor, the scanning beam can be moved as in a laser scanner. There, a light beam generated by a laser periodically scans the monitoring region with the aid of a deflection unit. In addition to the measured distance information, the angular position of the object is determined from the angular position of the deflection unit, and thus the location of an object in the monitored area is detected in two-dimensional polar coordinates.

Another possibility for extending the measuring range and for obtaining additional distance data is to simultaneously detect multiple measuring points with multiple scanning beams. This can also be combined with a laser scanner, which in that case not only detects one monitoring plane, but a three-dimensional spatial area via a large number of monitoring planes. In most laser scanners, the scanning movement is achieved by a rotating mirror. However, especially when multiple scanning beams are used, it is also known in the art to instead rotate the entire measuring head with light transmitters and light receivers, as for example described in DE 197 57 849 B4.

The arrangement of the several scanning beams or scanning planes determines which information is obtained from the three-dimensional space area. Exemplary parameters are the number and density of the scanning beams. Depending on the application, there may be quite different requirements. A simple adaptation of the beam configuration would be desirable in order to be able to cover different requirements.

Some conventional multi-beam laser scanners use a monolithic line of light transmitters or light receivers. However, in that case the scanning planes are fixed at a certain, equidistant spacing and are close together because the space on the semiconductor material of the transmitting and receiving elements should be used optimally. Thus, there is at most only the possibility to discard data from scanning planes that are not used in a certain application, but this is not an adaptation of the device, but on the contrary only partially uses its efficiency.

U.S. Pat. No. 8,767,190 B2 takes the approach of providing a separate light transmitter and light receiver for each scanning plane. Thus, in principle, it is possible to adjust each individual scanning plane as desired. The system is indeed highly flexible, but only at the cost of an enormous effort for the components and the respective individual adjustment.

In EP 2 863 176 A2, a rotating platform is disclosed on which various detection modules can rotate. Embodiments with detection modules for optoelectronic distance measurement, however, only have one scanning beam per module. On the one hand, this is proposed for a redundant two-channel measurement. In another embodiment, a plurality of distance-measuring detection modules are aligned approximately in the direction of the axis of rotation and tilted with respect to one another. Like in U.S. Pat. No. 8,767,190 B2, an individual adjustment of the tilt angle is necessary for a specific configuration of scanning planes. Thus, a higher flexibility by simple means is still not achieved.

DE 10 2004 014 041 A1 is about a sensor system for obstacle detection of the laser scanner type that uses a laser line and a line of photodiodes. Such line arrangements have the disadvantages mentioned above of defining an equidistant, dense spacing of the scanning planes. In an embodiment of DE 10 2004 014 041 A1, three such scanning systems whose elevation angle can be varied by a lifting motor are arranged each offset by 120° in the direction of rotation. This sets the observed regions of the respective scanning systems in such a way that together they cover as large a continuous range of elevation angles as possible. A disclosed numerical example sets the elevation angle in the three scanning systems to {18°, 12°, 6°}, {6°, 0°, 6°}, {6°, 12°, 18°}. The flexibility still remains comparatively small.

It is therefore an object of the invention to provide a more flexible multi-beam system.

This object is satisfied by an optoelectronic sensor, in particular a laser scanner, for detecting objects in a monitoring region, the sensor having a scanning unit movable about an axis of rotation, a plurality of scanning modules for periodically scanning the monitoring region and for generating corresponding received signals, and an evaluation unit for obtaining information about the objects from the received signals, the scanning modules comprising at least one light transmitter for transmitting several light beams separated from one another and at least one light receiver for generating the received signals from the light beams remitted by the objects, wherein at least one scanning module is at least one of tilted by a tilt angle relative to its main viewing direction and rotated by a rotation angle, the tilt angle being measured with respect to a central scanning plane perpendicular to the axis of rotation, and the rotation angle being measured about an axis corresponding to the main viewing direction.

The object is also satisfied by a method for detecting objects in a monitoring region which is periodically scanned by means of a scanning unit movable about an axis of rotation and having a plurality of scanning modules, wherein the scanning modules each transmit a plurality of light beams which are separated from one another, receive them again as remitted light beams after remission at the objects and generate corresponding received signals, and wherein the received signals are evaluated in order to obtain information about the objects, wherein an arrangement of scanning planes is defined by combining scanning modules which are at least one of tilted by a tilt angle with respect to their main viewing direction and rotated by a rotation angle, the tilt angle being measured with respect to a central scanning plane perpendicular to the rotation axis, and the rotation angle being measured about an axis corresponding to the main viewing direction.

A plurality of scanning modules each generate and receive a plurality of light beams and have at least one light transmitter and at least one light receiver. The light beams are not to be understood as beams within a larger light bundle in the sense of beam optics, but as separated light bundles and thus individual scanning beams, which generate corresponding individual, spaced-apart light spots in the monitoring region when impinging on an object. A scanning unit rotating or at least swivelling about an axis of rotation provides for the scanning beams to periodically scan the monitoring region. An evaluation unit obtains information about the objects at the respective scanned points from the received signals.

The invention start from the basic idea of enabling adapted configurations of scanning beams by tilting and/or rotating scanning modules, or adapted configurations of scanning planes due to movement about the axis of rotation. To this end, at least one scanning module is tilted by a tilt angle and/or rotated by a rotation angle. These angles are measured or defined with respect to the main viewing direction of the scanning module. A scanning module does have several scanning beams, which are preferably not all parallel and thus aligned in the same viewing direction. Nevertheless, the scanning module as a whole has a single main viewing direction, which for example is given by its central axis, a central scanning beam or an average direction of all scanning beams of the scanning module. The conventional alignment of a scanning module, neither tilted nor rotated, would be the one with the main viewing direction into the central scanning plane perpendicular to the axis of rotation and with the scanning module arranged upright. According to the invention, the main viewing direction is tilted from this tilt angle zero and thus no longer corresponds to the central scanning plane and/or the scanning module is rotated from this rotation angle to zero and thus has a non-upright orientation with the extreme of lying on its side. To complete the terminology, it should also be mentioned that in this specification the angle by which the scanning unit moves around the axis of rotation is referred to as the scanning angle. An angular distance between the scanning beams, on the other hand, is called the elevation angle, whereas, strictly speaking, it is only an effective elevation angle after projection with the rotation angle, as will be explained later in more detail.

The invention has the advantage that it is very easy to adapt the beam or plane configuration. Numerous different arrangements of measuring planes are possible, and this simply by tilting or rotating scanning modules largely without new development and without the high adjustment effort in the case of individually adjustable beams. This allows a quick and flexible adaption to changing requirements during the course of a product's life, and new device variants can easily be created, right up to individual production in individual pieces for special customer requirements.

The scanning modules preferably are accommodated in the scanning unit. The sensor thus has a measuring head that can move about the axis of rotation. This is a design that can be particularly well combined with various configurations of tilted and rotated scanning modules. Alternatively, it is also possible that the scanning modules are not movably arranged and that the scanning beams are periodically deflected by a mirror movable about the axis of rotation, in particular a rotating mirror or a polygon mirror wheel. Throughout this specification, the terms preferred or preferably refer to an advantageous, but completely optional feature.

At least one of the tilt angle and the rotation angle preferably is fixed. Therefore, there is no adjustment mechanism to change these angles during operation. For a specific device, the scanning modules are mounted at specific angles. This does not rule out the possibility that the devices may have mounting positions for scanning modules that allow mounting at different angles, whereby certain angles are selected during mounting.

The tilt angle preferably is in an interval including 0°, in particular in the range of ±60° or less, for example ±50°, ±40° or ±30°. This means that the main viewing direction is approximately radially outwards and in any case clearly deviates from the direction of the axis of rotation. Accordingly, the scanning planes are arranged in a vicinity of the central scanning plane perpendicular to the axis of rotation. Preferably for at least one scanning module, if not several or all, the tilt angle is not equal to zero. The central scanning plane can still be detected, if desired in the scanning beam configuration, because the light beams in a tilted scanning module may again be tilted against its main viewing direction.

The sensor preferably has two to ten scanning modules. Typically there are two to four scanning modules. If there are more than ten scanning modules, the overall structure becomes quite complex, but this case is not excluded in principle if numerous scanning beams are required.

A scanning module preferably generates two to ten light beams. Some preferred numbers are three to six and eight. Again, larger numbers are also conceivable in principle, for example sixteen. However, more flexibility is obtained with a scanning module having only a few light beams, and a multitude of scanning beams is then achieved by multiplying the scanning modules.

At least some, preferably all, light beams of a scanning module preferably have a mutual angular offset. Thus at least not all light beams of a scanning module are parallel to each other. Preferably, the light beams of a scanning module form a uniform angular grid. The angular grid is possibly uniform only in three-dimensional space, such as a quadrant, and the planar angles projected onto a tilted or rotated axis of the scanning modules themselves are actually not uniform. In both cases, the components of a scanning beam configuration are regular and therefore easy to handle. By combining scanning modules, it is nevertheless possible to create a wide variety of scanning beam configurations, even irregular ones. The scanning modules preferably have light transmitters and light receivers, respectively, that can be used for arranging light beams also with larger and irregular mutual distances. The light beams of a scanning module are thus preferably arranged in such a way that between their scanning planes there are areas of the field of vision that are not scanned. This in particular is achieved by individual and thus individually adjustable light sources or light receiving elements, i.e. no transmitter or receiver lines which always generate scanning planes close to one another.

The scanning modules preferably are at least one of tilted and rotated in such a way that scanning planes with uniform angular spacing are generated. This now refers to the overall configuration, no longer to individual scanning modules. There are different possibilities to achieve a uniform overall angular spacing. The scanning modules can divide the entire angular range and complement one another directly as neighbors. It is also conceivable that scanning modules refine and/or homogenize the angular grid of other scanning modules. To be exact, the term elevation angle would have to be used in the discussion of angles between scanning planes, but this is simplified here and in the following and obvious from the context.

The scanning modules preferably are at least one of tilted and rotated in such a way that scanning planes with a denser angular spacing are generated in at least one angular range. In such embodiments, there is a deliberate deviation from a uniform angular spacing because certain angular ranges are more interesting than others and more data should be obtained from them. One of numerous examples is a sensor for a vehicle that is primarily intended to acquire data at the height of traffic flows and relevant obstacles, and only few data from the ground or from greater height. However, the more densely scanned area does not have to be centrally located at an elevation angle of 0°, but can also be offset upwards or downwards, or several angular areas are monitored more densely than others. Also, the angular distance in the more densely and less densely monitored angular ranges does not have to be constant in itself.

The scanning modules preferably are at least one of tilted and rotated in such a way that at least some scanning planes are generated which are redundantly scanned. This allows redundant measurement data to be obtained, for example to generate measurement values with higher accuracy by calculating an average value. In safety technology, redundant measurements are used to protect the device against failures.

The scanning modules preferably are at least one of tilted and rotated in such a way that at least one angular range without scanning planes is generated. In such embodiments, there are gaps in the elevation angle range in which monitoring is not performed at all. The scanning modules therefore do not complement one another as direct neighbors, but leave a free space between them where no data is obtained. In this context, of course, gaps or free spaces are to be understood as being larger than the smallest distance between the discrete scanning beams within a scanning module after taking into account the rotation angle.

The scanning modules preferably are at least one of tilted and rotated in such a way that scanning planes of a scanning module are arranged between scanning planes of another scanning module. Thus, the angular ranges detected by these scanning modules overlap in order to increase the density of the acquired data in elevation or to acquire redundant data. According to this embodiment and that of the previous paragraph, it may be advantageous if scanning modules do not complement one another as direct neighbors by providing gaps and/or overlaps.

The scanning unit preferably comprises a plurality of mounting locations for scanning modules, wherein in particular not all of the mounting locations are occupied by a scanning module. Thus, the scanning unit is already prepared for the mounting of scanning modules. At the respective mounting positions, tilting and/or rotation can already be preset for the scanning module mounted there, or an adjustment is still possible at least within certain angular ranges. It is very easy to create additional variants by leaving mounting positions unused. The scanning unit offers kind of a maximum configuration, with the possibility to select smaller partial configurations with fewer scanning planes.

The scanning modules preferably are of identical construction among one another. This enables a considerably accelerated product development and variant formation. In new device variants, a main component in the form of the scanning module may remain unchanged. This scanning module only needs to be specified and validated once. This also significantly reduces the manufacturing costs due to high quantities of the same scanning modules despite forming different devices in the end, while the scanning modules for the various devices can even be manufactured at a common production place. Alternatively, it would also be conceivable to use a few types of different scanning modules for even more variants. Virtually all relevant scanning plane configurations can also be formed with identical scanning modules by varying the tilt and rotation. Nevertheless, it can be advantageous to provide, for example, two-beam, four-beam and eight-beam scanning modules and/or scanning modules with two or three different angle grids. This does not enable any new scanning plane configurations, because, for example, an eight-beam scanning module can be replaced by four two-beam scanning modules and a scanning module with a finer angular grid can be replaced by a correspondingly rotated scanning module with a coarser angular grid. However, there may be an advantage, because fewer components are required and/or, especially in the case of extreme rotations, less installation space is occupied.

At least some scanning modules preferably are at least one of arranged one above the other and offset with respect to one another in the direction of rotation. There are basically these two degrees of freedom to physically accommodate multiple scanning modules in the scanning unit. An offset in the direction of rotation, thus in the scanning angle, does not have any impact for the usual rotation speeds and thus quasi-static scenery. A height offset of scanning modules can slightly affect the scanning planes, depending on the size of the scanning modules.

In at least one scanning module a plurality of light beams are preferably arranged in a two-dimensional pattern in cross-section. This pattern refers to the arrangement of the scanning beams and not of the light transmitters and light receivers, although this can be the same if one light emitter and one light receiver correspond to one scanning beam. The latter is a possibility, but not a necessity because of beam splitting, beam joining and/or beam deflection, a plurality of light emission surfaces or light receiving elements per light transmitter or light receiver, or one light transmitter or light receiver being responsible for several scanning beams, but this difference is not discussed in any detail. Two-dimensional patterns may have optical or structural advantages within the scanning module. Due to the movement of the scanning unit about the axis of rotation, only the part of the two-dimensional pattern in the height direction perpendicular to the movement has an effect; the two-dimensional pattern therefore acts effectively like a line arrangement projected onto the height direction, which is also a conceivable alternative arrangement.

At least two scanning modules preferably have a common circuit board. In particular, the light transmitters and/or light receivers are accommodated on the circuit board. Such a common circuit board further reduces the complexity and is preferably used when the scanning modules involved are arranged one above the other or offset by a scanning angle of 180°, where in the latter case the front and rear sides are used. Other scanning angles are also possible using flex boards or the like.

The evaluation unit preferably is adapted to determine a distance of the object by means of a light time of flight between transmitting the light beams and receiving the remitted light beams. The sensor thus becomes a distance-measuring sensor. As an alternative, only the presence of an object is detected and for example output as a switching signal.

The method according to the invention can be modified in a similar manner and shows similar advantages. Further advantageous features are described in an exemplary, but non-limiting manner in the dependent claims following the independent claims.

Figure 2:
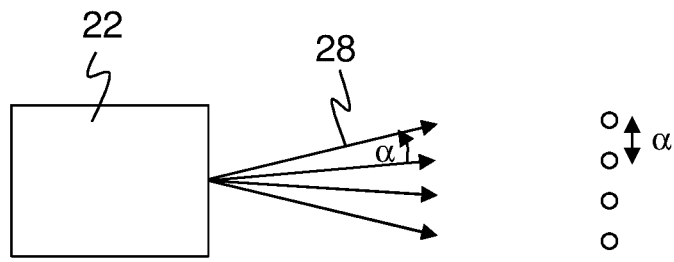
Figure 3A:
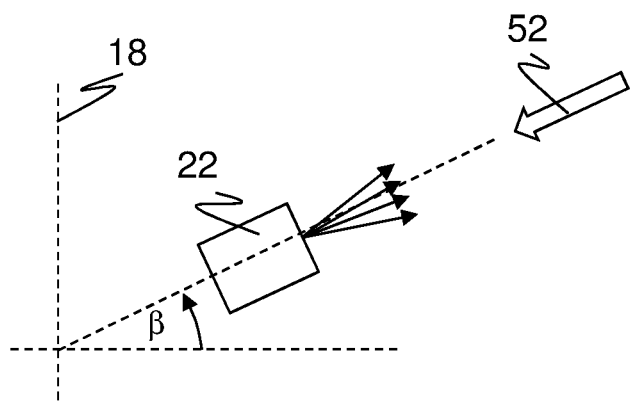
Figure 3B:
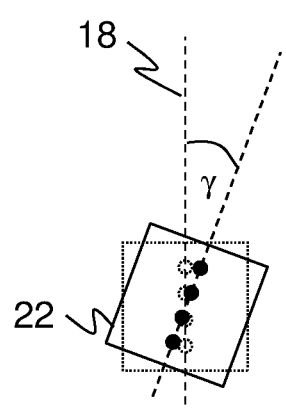
Figure 3C:
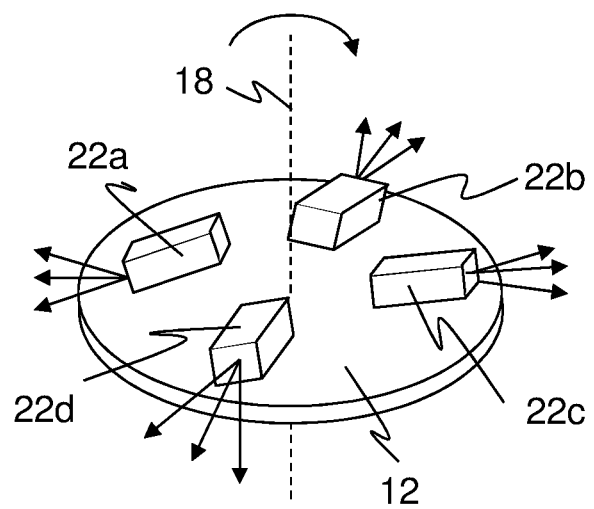
Figure 4A:
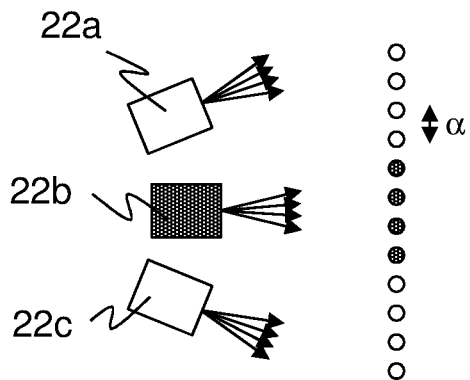
Figure 4B:
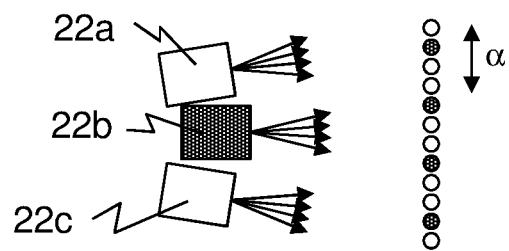
Figure 5A:
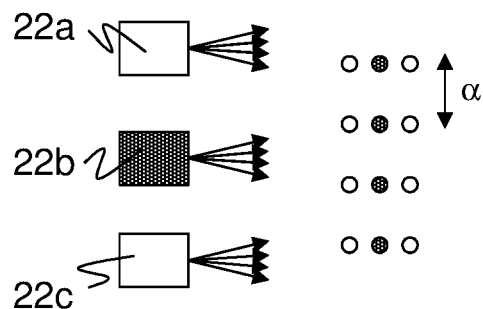
Figure 5B:
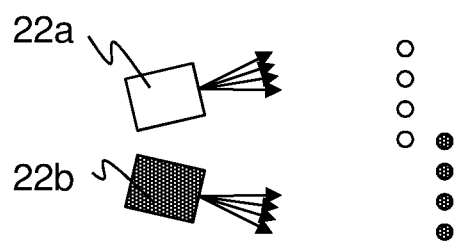
Figure 6:
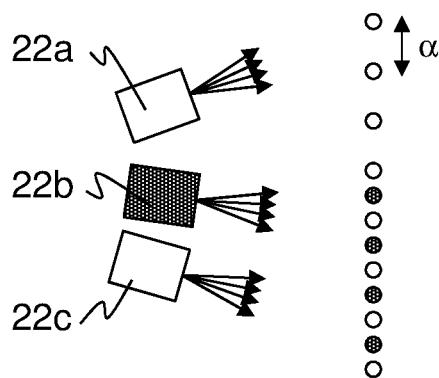
Figure 7:
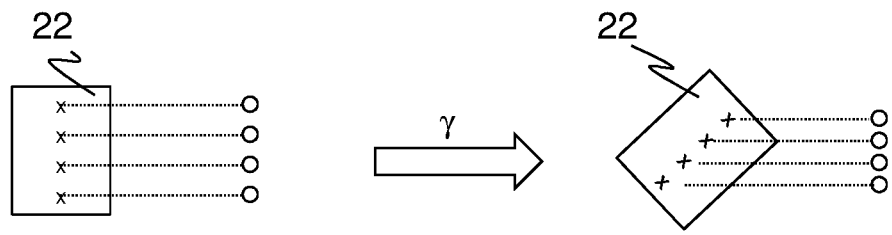
Figure 8A:
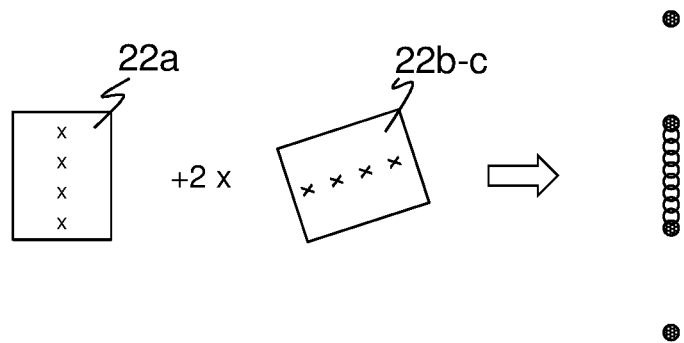
Figure 8B:
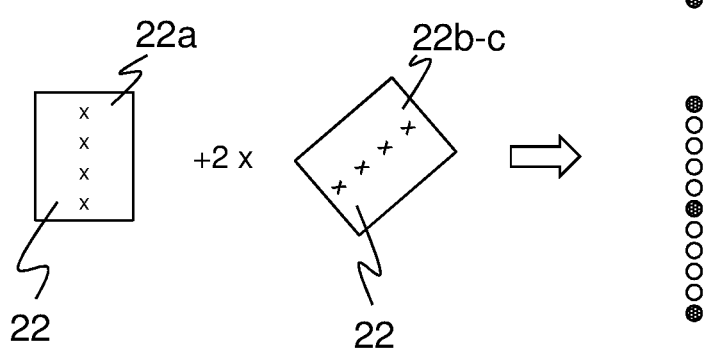
Figure 9A:
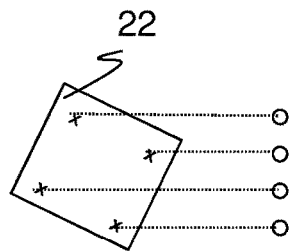
Figure 9B:
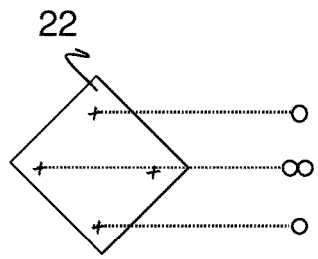
Figure 9C:
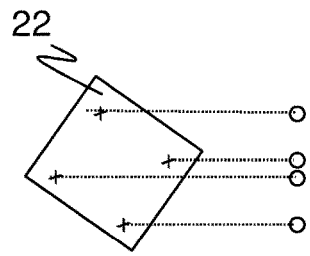
Figure 9D:
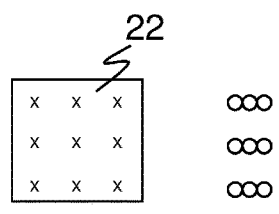
Figure 9E:
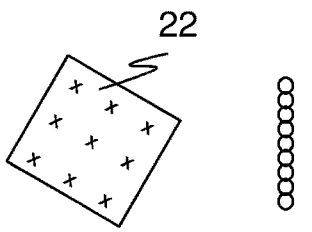
Figure 9F:
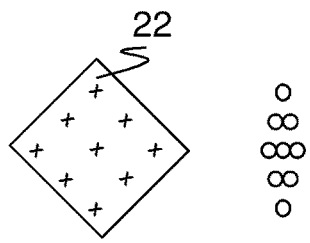
Figure 10A:
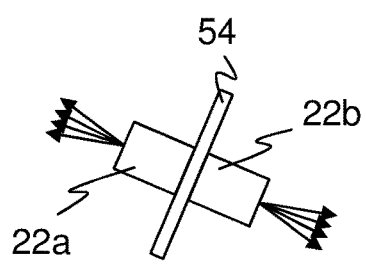
Figure 10B:
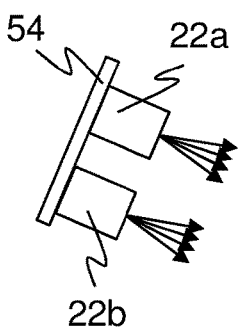
Figure 10C:
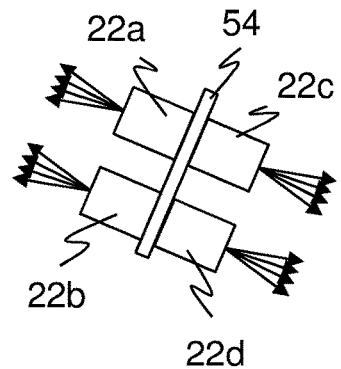
Figure 11A:
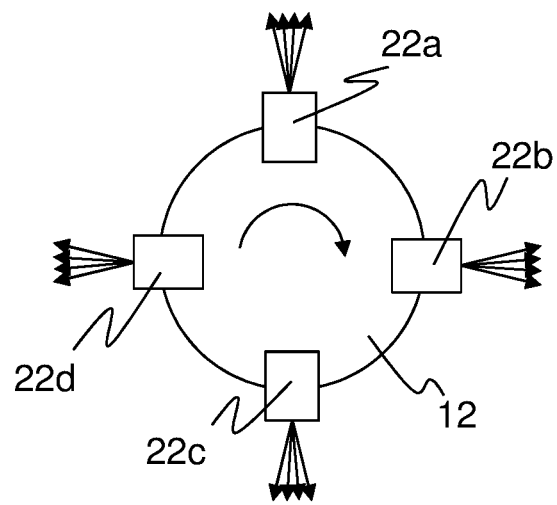
Figure 11B:
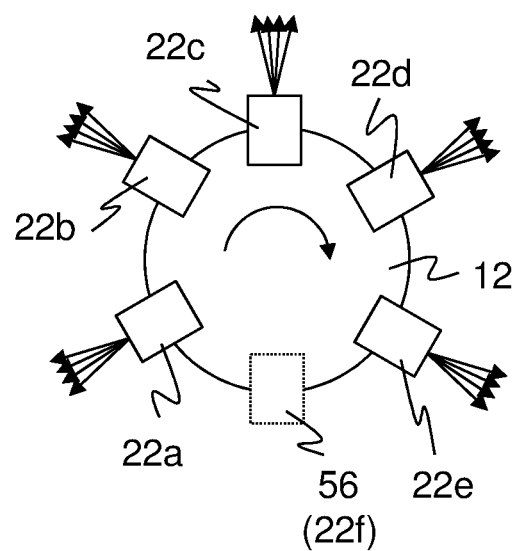
Figure 12:
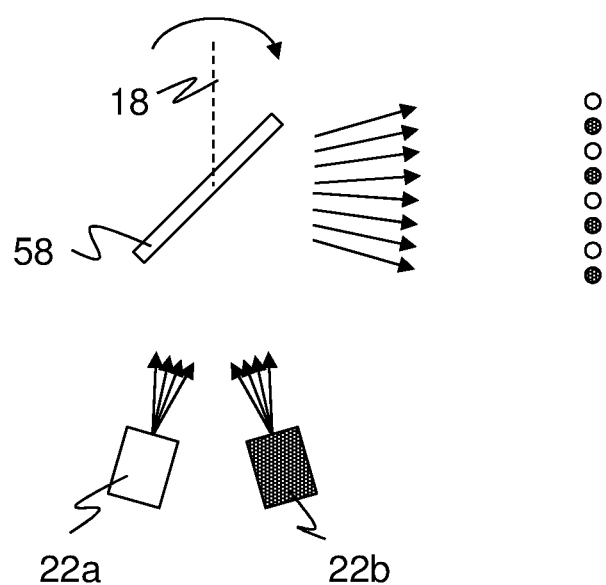

The invention will be explained in the following also with respect to further advantages and features with reference to exemplary embodiments and the enclosed drawing. The Figures of the drawing show in:

FIG. 1 a sectional view of an optical sensor in an embodiment as a laser scanner;

FIG. 2 a schematic representation of one scanning module with its scanning beams or planes;

FIG. 3a a sectional view of a scanning module to explain the tilt angle;

FIG. 3b a plan view of the entrance and exit area of the light beams of a scanning module to explain the rotation angle;

FIG. 3c a perspective view of an exemplary configuration of four scanning modules with different tilt and rotation angles;

FIG. 4a an example configuration with three scanning modules generating uniformly spaced scanning planes;

FIG. 4b an example configuration with three scanning modules that also generate evenly spaced but denser scanning planes via overlap;

FIG. 5a an example configuration with three scanning modules generating redundant scanning planes;

FIG. 5b an example configuration with two scanning modules generating partially redundant scanning planes;

FIG. 6 an example configuration with three scanning modules that generate scanning planes with different densities at different heights;

FIG. 7 a top view of a scanning module to explain the compression of scanning planes by varying the rotation angle;

FIG. 8a an example configuration with three scanning modules, two of which have a varied rotation angle, to generate an area with equidistantly spaced and additional, more remote scanning planes;

FIG. 8b an example configuration similar to FIG. 8a, now having a larger subrange, but with further spaced equidistant scanning planes;

FIG. 9a-c sample configurations comprising a scanning module having four scanning beams arranged in a square, and representations of the effect of a variation of its rotation angle;

FIG. 9d-f sample configurations comprising a scanning module having nine scanning beams arranged in a square and representations of the effect of a variation of its rotation angle;

FIG. 10a-c representations of configurations having a plurality of scanning modules at different heights and/or scanning angles using a common circuit board;

FIG. 11a a plan view along the axis of rotation of an example configuration with four scanning modules offset from one another in the scanning angle;

FIG. 11b a plan view similar to FIG. 11a having six mounting positions for scanning modules of which only five are actually occupied; and FIG. 12 an example configuration with two scanning modules and a periodic deflection by a movable mirror element instead of a movable scanning head.

FIG. 1 shows a schematic sectional view of an optoelectronic sensor 10 in an embodiment as a modular multi-beam laser scanner. The sensor 10 comprises, in a general overview, a movable scanning unit 12 and a base unit 14. The scanning unit 12 is the optical measuring head, while the base unit 14 provides further elements such as a power supply, evaluation electronics, connections and the like. During operation, a drive 16 of the base unit 14 is used to rotate the scanning unit 12 about a rotary axis 18 in order to periodically scan a monitoring region 20.

Several scanning modules 22a-b are provided in the scanning unit 12. In the example shown there are two scanning modules 22a-b, in general up to ten and in some cases even more scanning modules are conceivable. The scanning modules 22a-b are inclined, i.e. tilted with respect to the rotary axis 18. They can alternatively or additionally be rotated against their own center axis, which is not visible in the sectional view of FIG. 1. The tilt angles and rotation angles of scanning modules 22a-b will be explained later with reference to FIGS. 2 to 11.

The scanning modules 22a-b each comprise a light transmitting unit 24, for example having LEDs or lasers in the form of edge emitters or VCSELs, which generate several transmitted light beams 28 with mutual angular offset by means of common transmission optics 26 which are only represented as a function block, and the light beams 28 are transmitted into the monitoring region 20. Depending on the embodiment, several light sources with their own circuit boards or a common circuit board for the several transmitted light beams 28 can be used, or the light from a light source or some light sources is divided by a beam splitter element or a diffractive optical element. In the example shown there are four transmitted light beams 28, in general there are typically two to ten transmitted light beams per scanning module 22a-b, possibly even more.

To avoid stray light within the sensor 10, the internal light path of the transmitted light beams 28 can be shielded by an opaque tube 30. If the transmitted light beams 28 impinge on an object in the monitoring region 20, the corresponding remitted light beams 32 return to the sensor 10. The remitted light beams 32 are guided by receiving optics 34 to a light receiver 36. The light receiver 36 has spatial resolution and is therefore capable of generating a separate electrical reception signal from each of the remitted light beams 32. Several photodiodes or APDs (avalanche diodes) are conceivable for this purpose, but also an image sensor with correspondingly assigned individual pixels or pixel groups. Another possible embodiment provides a SPAD receiver (single-photon avalanche diode) with a large number of SPADs. It is also conceivable to direct several remitted light beams 32 onto the same receiving element by means of the receiving optics 34. Then, the remitted light beams 32 are distinguished for example by multiplexing, i.e. sequential activation of transmitted light beams 28.

In the embodiment of FIG. 1, the light receiver 36 is arranged on a circuit board 38, which is arranged on the axis of rotation 18 and is connected to the shaft 40 of the drive 16. The receiving optics 34 are supported by pins 42 on the circuit board 38 and hold another circuit board 44 of the light transmitting unit 24. The two circuit boards 38, 44 are interconnected and can also be configured as a common Flexprint circuit board.

The optical design shown in FIG. 1 with two circuit boards 38, 44 or circuit board areas stacked one above the other and common transmitting optics 26 arranged centrally within the receiving optics 34 is to be understood purely as an example. Alternatively, any other arrangement known per se from one-dimensional optoelectronic sensors or laser scanners, such as a biaxial arrangement or the use of a deflecting or beam splitting mirror, would be possible. Furthermore, it is conceivable to mount light transmitter unit 24 and light receiver 36 on a common circuit board, with a different arrangement of the optics as compared to FIG. 1 for example on a common circuit board which is arranged in a same plane. The common optics 26, 34 shown are particularly advantageous, but alternatively several optics for several or even individual light beams 28, 32 are also possible.

The basic arrangement with scanning modules 22a-b in the rotatable scanning unit 12 is also an exemplary embodiment. Alternatively, it is also possible to use stationary scanning modules 22a-b, whose light beams 26, 32 are then deflected by a mirror element movable around the axis of rotation 18. Corresponding embodiments will be explained later with reference to FIG. 12.

A contactless supply and data interface 46 connects the movable scanning unit 12 with the stationary base unit 14. In the stationary base unit 14, there is a control and evaluation unit 48, which can at least partly also be accommodated on the circuit board 38 or elsewhere in the scanning unit 12. The control and evaluation unit 48 controls the light transmitter unit 24 and receives the reception signal of the light receiver 36 for further evaluation. It also controls the drive 16 and receives the signal from an angle measuring unit which is not shown and generally known from laser scanners and determines the respective angle position of the scanning unit 12.

For evaluation, the distance to a scanned object is preferably measured using a light time of flight method known per se. Together with the information about the angle position of the angle measuring unit, two-dimensional polar coordinates with angle and distance of all object points in a scanning plane are available after each scanning period. The respective scanning plane is also known via the identity of the respective remitted light beam 32, so that a three-dimensional spatial area is scanned in total.

The object positions or object contours are thus known and can be output via a sensor interface 50. The sensor interface 50 or another connection that is not shown may serve as a parameterization interface. The sensor 10 can also be configured as a safety sensor for use in safety technology to monitor a source of danger, such as a dangerous machine. In that case, a protective field is monitored that must not be entered by operating personnel during machine operation. If the sensor 10 detects a forbidden protective field intrusion, such as an operator's leg, it triggers an emergency stop of the machine. Sensors used in safety technology must be particularly reliable and therefore meet high safety requirements, such as the EN13849 standard for machine safety and the EN61496 device standard for electro-sensitive protective equipment (ESPE). In particular, the sensor interface 50 can then be configured as a safe output interface (OSSD, Output Signal Switching Device) in order to output a safety-related switch-off signal in the event of a protective field intrusion by an object.

The shown sensor 10 is a laser scanner with a rotating measuring head, namely the scanning unit 12. An alternative embodiment swivels the scanning unit 12 back and forth instead of the rotary movement. An embodiment as a simple multi-beam sensor without scanning movement is also possible, which then is virtually only a stationary scanning unit 12 with corresponding electronics, but without the base unit 14.

During the rotation of the sensor 10, each of the transmitted light beams 28 scans an area. Only at an elevation angle of 0°, thus a horizontal transmitted light beam which in FIG. 1 is only approximately present, an actual plane of the monitoring region 20 is scanned. The other transmitted light beams 28 scan the outer surface of a cone, which has different inclination depending on the deflection angle. With a plurality of transmitted light beams 28 deflected upwards and downwards at different angles, something like several interleaved hourglasses is generated as a scanning structure. These surfaces are also referred to as scanning planes for the sake of simplicity.

FIG. 2 schematically shows a single scanning module 22 with its transmitted light beams 28. The transmitted light beams 28 also represent the associated remitted light beams 32 and are often referred to as scanning beams. Since the movement around the axis of rotation 18 generates scanning planes, the wording that a scanning module 22 generates scanning planes and not just scanning beams is also used.

The scanning module 22 generates transmitted light beams 28 with mutual angular spacing α, which is preferably but not necessarily uniform. The resulting configuration of scanning planes is indicated by small circles on the right side of FIG. 2. In this example, four scanning planes with uniform spacing in their elevation angle α result.

The scanning module 22 in FIG. 2 is consciously shown without its elements already explained with reference to FIG. 1, in order to emphasize that there are various design possibilities and that in the end only the generated scanning beams and scanning planes matter. In addition to the electro-optical and optical components for the generation of transmitted light beams 28 and the reception of remitted light beams 32, a scanning module 22 can also include its own evaluation electronics, so that it directly outputs distance data. Alternatively, only raw or pre-processed received signals can be transmitted to the evaluation unit 48 or to evaluation electronics in the scanning unit 12 for one scanning module 22 or several scanning modules 22a-b, or the evaluation tasks can be distributed.

In the multiple arrangements of scanning modules 22 described below, the individual scanning modules 22 are preferably identical among one another. Symmetric scanning modules 22 are also preferred, because this has advantages for the optical design.

According to the invention, scanning modules 22 are combined with different tilt angles and/or rotation angles, which in turn may also result in irregular scanning plane configurations.

With reference to FIGS. 3a-b, the terms tilt angle and rotation angle are introduced in more detail. FIG. 3a is another sectional view of a scanning module 22 having a tilt angle β. The tilt angle β is measured against a perpendicular line to the rotation axis 18, thus it is the angle by which the main viewing direction or the central axis of the scanning module 22 is tilted from a central scanning plane β=0. The individual scanning beams of the scanning module 22 may deviate from the tilt angle β according to their mutual angular distance α. The main viewing direction preferably is at least roughly radially outwards, thus perpendicular to the rotation axis 18 and in any case clearly deviating from the direction of the rotation axis 18. An exemplary range for the tilt angle is [−60°, +60°], whereby stronger restrictions such as [−50°, +50°], [−40°, +40°] or [−30°, +30°] are also conceivable.

FIG. 3b shows a plan view of the entrance and exit area of a scanning module 22. The perspective of this plan view is indicated by an arrow 52 in FIG. 3a. The scanning module 22 is rotated by a rotation angle γ against the upright orientation shown with dotted lines. The rotation angle γ therefore measures a rotation of the scanning module 22 around its own main viewing direction. With increasing rotation angle γ, the scanning beams effectively move closer together, namely in height direction, until with a scanning module 22 lying on its side with γ=90° only the scanning plane in the main viewing direction is scanned, but several times.

FIG. 3c shows in perspective an example with four scanning modules 22a-d at different tilt angles β and rotation angles γ. In order to complete the terminology, the scanning angle measures the rotation of the scanning unit 12 around the rotation axis 18, and the elevation angle, as usual, denotes the height, more precisely the angle against the plane perpendicular to the rotation axis 18.

According to the invention, scanning modules 22a-b with different tilt angles β and rotation angles γ are combined to obtain different scanning plane configurations, where at least one tilt angle β and/or at least one rotation angle γ is not equal to zero.

Numerous non-exhaustive examples are given below. The exemplary single scanning module 22 still generates four equidistant scanning beams and thus scanning planes, whereby both the number of four and the uniform angular grid within a scanning module 22 are examples and could also be selected differently. In the first examples with reference to FIGS. 4a to 6, the rotation angles γ of the scanning modules 22 are the same, in particular zero. The rotation angle γ can be selected differently for individual or all scanning modules 22.

FIG. 4a shows an example configuration with three scanning modules 22a-c with tilt angle β such that the scanning modules 22a-c directly complement one another as neighbors and thus jointly cover a large elevation angle range. The sampling density corresponds to that of the individual scanning modules 22a-c, since each is exclusively responsible for a certain elevation angle range. With identical scanning modules 22a-c or at least equal angular spacing within the scanning modules 22a-c, this results in a regular arrangement of the scanning planes. On the right side in FIG. 4a, the scanning planes are indicated by small circles, whereby here and in the following the hatching of these circles and of the associated scanning module 22a-c is identical in order to show the relation.

FIG. 4b shows an example configuration wherein three scanning modules 22a-c are less tilted to each other, resulting in a denser, overlapping scanning plane configuration. Overlapping means that scanning planes of a scanning module 22a-c are located between scanning planes of another scanning module 22a-c. In other words, scanning modules 22a-c interleave, and a scanning module 22a-c refines the angular grid of another scanning module 22a-c.

In FIGS. 4a and 4b, a connected elevation angle range interspersed with scanning planes is formed by direct neighborhood and overlapping, respectively. However, there could also be a gap by selecting a larger tilt angle β for the outer scanning modules 22a and 22c in FIG. 4a. Thus, through gaps or overlaps, configurations arise that do not result in a direct neighborhood of the scanning planes of scanning modules 22a-c, unlike in FIG. 4a.

FIG. 5a shows another example configuration for a redundant detection, which can for example be advantageous in the field of safety technology. This configuration provides for several scanning beams to detect the same scanning plane. In the example shown, this is done by using the same tilt angle β for several scanning modules 22a-c, whereby in that case the scanning frequency is increased not only by a factor of two, but even three due to having three scanning modules 22a-c with a same tilt. In the form shown in FIG. 5a with β=0, this configuration preferably is combined with a rotation angle γ≠0. It is also possible to provide a mutual offset in the direction of the scanning angle for the scanning modules 22a-c, for example of 120°, and thus to multiply the scanning frequency.

FIG. 5b shows another example configuration to illustrate that instead of complete redundancy, it is also possible to detect some scanning planes multiple times, but others not. In the example shown, only the lowest and uppermost scanning plane of scanning modules 22a-b, respectively, is captured twice due to the tilt angles β, but it is apparent that this would also be possible for several scanning planes with other tilt angles β.

FIG. 6 shows an example configuration with varying densities of the scanning planes. In the upper angle range, only one tilted scanning module 22a is responsible, while in the lower angle range, two scanning modules 22b-c, also slightly tilted against each other, effectively halve the angular grid. Accordingly, different angular ranges with denser and less dense scanning can be combined, whereby gaps are also possible, i.e. angular ranges in which there are no scanning planes apart from the discrete distance between two scanning beams of a scanning module 22a-c. This is also an example for the fact that with several symmetrically constructed scanning modules 22 complete scanners can be constructed that have an asymmetrical arrangement of the scanning beams.

In the example configurations explained so far, only the tilt angle β was varied. FIG. 7 illustrates in a plan view from the main viewing direction, as in FIG. 3b, the effect of a variation of the rotation angle γ which can be carried out alone, but also in combination with a tilting according to FIGS. 4 to 6. With some finite rotation angle γ, the scanning planes move closer together in a projection onto the height direction or the axis of rotation 18. Because of the movement about the axis of rotation 18, the lateral distance, in FIG. 7 in horizontal direction, causes merely a minimal time offset of the measurement, which could be compensated if necessary. The rotation angle γ is thus a parameter that can be used to reduce the effective angular distance α of the scanning beams of a scanning module 22a-c. Any combination of tilt angles β and rotation angles γ for individual scanning modules 22a-c or groups of scanning modules 22a-c is possible.

FIGS. 8a-b illustrate how different rotation angles γ generate additional scanning plane configurations. In the examples, an upright scanning module 22a, i.e. not rotated at γ=0, is combined with two scanning modules 22b-c rotated by γ≠0. The two rotated scanning modules 22b-c are furthermore slightly tilted to each other with different tilt angles β so that their angular grids refine each other. The rotation angle γ in FIG. 8a is larger than in FIG. 8b. The result is a range with denser scanning planes and a few more isolated scanning planes having slightly larger angular spacing. In FIG. 8a, the more densely detected angle range is smaller and interspersed with many scanning planes, in FIG. 8b it is larger with correspondingly lower density of the scanning planes.

Such arrangements are, for example, advantageous for autonomous or semiautonomous vehicles, which use the denser scanning beams to monitor the frontal environment in detail for navigation and collision avoidance, and monitor air and ground with the more distant beams, for example to ensure alignment in elevation and to detect holes or staircases.

Until now, it has been assumed that the scanning beams within the scanning modules 22 are arranged within one plane, i.e. the scanning beams form a line arrangement in cross-section. FIGS. 9a-f illustrate advantageous arrangements with a two-dimensional cross-sectional pattern of the scanning beams. This makes use of the fact that effectively a projection onto the height direction takes place due to the movement about the axis of rotation 18, so in that sense two-dimensional patterns behave like line arrangements. However, two-dimensional patterns offer additional design and optical possibilities and symmetries.

In FIGS. 9a-c, the scanning beams form a 2×2 square. Depending on the rotation angle γ, equidistant scanning planes such as those in FIG. 9a, partially redundant scanning planes such as those in FIG. 9b, or areas of different density such as those in FIG. 9c can be generated.

In FIGS. 9d-f, the scanning planes form a 3×3 square. Thus, the rotation angle γ makes it possible to form three scanning planes each scanned three times as in FIG. 9d, to emulate a line arrangement with nine scanning beams and thus to cover an angular range equidistantly with scanning planes as in FIG. 9e, to combine different redundancies with an equidistant scanning as in FIG. 9f, or to generate irregular configurations at other rotation angles γ. The two square arrangements are only one example of a two-dimensional pattern, the additional degree of freedom offers many further possibilities.

It is particularly advantageous for the invention if the scanning modules 22 are identical in construction and thus form similar basic components for a sensor 10. On the other hand, it can also be advantageous to assemble scanning modules 22 at least partially in combination, in particular with a common circuit board 54 for light transmitter unit 24 and/or light receiver 36. For this purpose, the front and rear sides of the common circuit board 54 can be used with the main viewing direction offset by 180° in the scanning angle as shown in FIG. 10a. A common circuit board 54 is also possible with adjacent scanning modules 22a-b, in particular scanning modules 22a-b arranged one above the other as in FIG. 10b, which in this case is equipped from the same side. An offset in scanning angle and height direction can also be combined with a common circuit board 54, as FIG. 10c shows. With the help of a Flexprint circuit board or the like, even an offset in the scanning angle unequal to 180° or different tilt angles β on a common circuit board 54 are conceivable.

FIG. 11a shows the scanning unit 12 in a plan view, in this example having four scanning modules 22a-d each offset by 90° in the scanning angle and directed radially outward with their main viewing direction. It would also be conceivable to fold the beam path of some or all scanning modules 22a-d by means of deflection elements. It is not the mounting of the scanning modules 22a-d itself, but the optical effect that is important for the scanning plane configuration.

FIG. 11b shows an alternative arrangement with mounting positions 56 for six scanning modules 22a-f. In this case, not all mounting positions 56 are occupied, but only five of the six possible scanning modules 22a-f are installed. In this way, there can be a common platform for a multitude of sensors 10, in which a further scanning plane configuration can simply be generated by omitting scanning modules 22a-f.

FIG. 12 illustrates another family of embodiments. In contrast to FIG. 1, no movable scanning unit 12 is provided wherein the scanning modules 22 move. Rather, the scanning modules 22a-b themselves are stationary. The periodic scanning is generated by a mirror 58 which moves about the axis of rotation 18 and preferably is configured as a rotating mirror. Here, too, a large number of three-dimensional scanning patterns can be generated by tilting and rotating scanning modules. FIG. 12 shows just one example; the numerous embodiments previously explained for scanning modules 22 moved in the scanning unit 12 are also possible with a mirror 58. The definition of the main viewing direction can be related either directly to the scanning module 22 or to the beam path generated after the mirror 58 and folded by the mirror 58. As an alternative to a simple mirror 58, as shown in FIG. 12, a polygon mirror wheel can also be used, which does not scan 360° during a rotation, but instead scans a scanning angle section several times due to several mirror facets. In addition, it is conceivable to use a corresponding static configuration of scanning modules 22a-b without a rotating mirror as a non-scanning multi-beam measuring device.

As explained in numerous examples, the scanning modules 22, which in particular may be identical with each other, allow a large number of scanning plane configurations. The specific sensor 10 for a particular application can be manufactured with little effort: Should all scanning planes be arranged close to each other or should they rather be at a large distance from each other in order to allow a large monitoring range 20? Should some of the scanning planes be scanned multiple times in order to achieve shorter response times or redundancy for safety technology applications? Should the scanning planes be arranged in a uniform angular grid, or should more scanning planes cover specific angular ranges, even if this can lead to an irregular spacing between the planes? This is all possible according to the invention by selecting tilt angle β and rotation angle γ.

The invention claimed is:

1. An optoelectronic sensor (10) for detecting objects in a monitoring region (20), the sensor (10) having a scanning unit (12, 58) movable about an axis of rotation (18), a plurality of scanning modules (22) for periodically scanning the monitoring region (20) and for generating corresponding received signals, and an evaluation unit (48) for obtaining information about the objects from the received signals, the scanning modules (22) comprising at least one light transmitter (24) for transmitting several light beams (28) separated from one another and at least one light receiver (36) for generating the received signals from the light beams (32) remitted by the objects,
wherein at least two of the scanning modules (22) are rotated with respect to one another by a rotation angle (γ), the rotation angle (γ) being measured about an axis corresponding to the main viewing direction.

2. The optoelectronic sensor (10) according to claim 1, wherein the optoelectronic sensor (10) is a laser scanner.

3. The optoelectronic sensor (10) according to claim 1, wherein the scanning modules are accommodated in the scanning unit (12).

4. The optoelectronic sensor (10) according to claim 1, having two to ten scanning modules (22).

5. The optoelectronic sensor (10) according to claim 1, wherein a scanning module (22) generates two to ten light beams (28, 32).

6. The optoelectronic sensor (10) according to claim 1, wherein light beams (28, 32) of a scanning module (22) have a mutual angular offset (α).

7. The optoelectronic sensor (10) according to claim 1, wherein the scanning unit (12) comprises a plurality of mounting locations (56) for scanning modules (22), wherein not all of the mounting locations (56) are occupied by a scanning module (22).

8. The optoelectronic sensor (10) according to claim 1, wherein the scanning modules (22) are of identical construction to one another.

9. The optoelectronic sensor (10) according to claim 1, wherein at least some scanning modules (22) are at least one of arranged one above the other and offset with respect to one another in the direction of rotation.

10. The optoelectronic sensor (10) according to claim 1, wherein in at least one scanning module (22) a plurality of light beams (28, 32) are arranged in a two-dimensional pattern in cross-section.

11. The optoelectronic sensor (10) according to claim 1, wherein at least two scanning modules (22) have a common circuit board (54).

12. The optoelectronic sensor (10) according to claim 1, wherein the evaluation unit (48) is adapted to determine a distance of the object by means of a light time of flight between transmitting the light beams (28) and receiving the remitted light beams (32).

13. The optoelectronic sensor (10) according to claim 1, wherein the at least two scanning module (22) are further tilted by a tilt angle (β) relative to the main viewing direction, the tilt angle (β) being measured with respect to a central scanning plane perpendicular to the axis of rotation (18).

14. The optoelectronic sensor (10) according to claim 13, wherein at least one of the tilt angle (β) and the rotation angle (γ) is fixed.

15. The optoelectronic sensor (10) according to claim 13, wherein the tilt angle (β) is in an interval including 0°.

16. The optoelectronic sensor (10) according to claim 13, wherein the tilt angle (β) is in the range of ±60°.

17. The optoelectronic sensor (10) according to claim 13, wherein the scanning modules (22) are at least one of tilted (β) and rotated (γ) in such a way that scanning planes with uniform angular spacing are generated.

18. The optoelectronic sensor (10) according to claim 13, wherein the scanning modules (22) are at least one of tilted (β) and rotated (γ) in such a way that scanning planes with a denser angular spacing are generated in at least one angular range.

19. The optoelectronic sensor (10) according to claim 13, wherein the scanning modules (22) are at least one of tilted (β) and rotated (γ) in such a way that at least some scanning planes are generated which are redundantly scanned.

20. The optoelectronic sensor (10) according to claim 13, wherein the scanning modules (22) are at least one of tilted (β) and rotated (γ) in such a way that at least one angular range without scanning planes is generated.

21. The optoelectronic sensor (10) according to claim 13, wherein the scanning modules (22) are at least one of tilted (β) and rotated (γ) in such a way that scanning planes of a scanning module (22) are arranged be-tween scanning planes of another scanning module (22).

22. A method for detecting objects in a monitoring region (20) which is periodically scanned by means of a scanning unit (12, 58) movable about an axis of rotation (18) and having a plurality of scanning modules (22), the method comprising:
rotating at least two of the plurality of scanning modules (22) with respect to one another;
the scanning modules (22) each transmitting a plurality of light beams (28) which are separated from one another;
the scanning modules (22) receiving the plurality of light beams as remitted light beams (32) after remission at the objects and generating corresponding received signals; and
evaluating the received signals to obtain information about the objects,
wherein an arrangement of scanning planes is defined by combining scanning modules (22) which are rotated by a rotation angle (γ), the rotation angle (γ) being measured about an axis corresponding to the main viewing direction.

23. The method according to claim 22, further comprising the step of tilting the at least two scanning module (22) by a tilt angle (β) relative to the main viewing direction, the tilt angle (β) being measured with respect to a central scanning plane perpendicular to the axis of rotation (18).

\* \* \* \* \*